(12) United States Patent
Yonezawa et al.

(10) Patent No.: US 7,165,763 B2
(45) Date of Patent: Jan. 23, 2007

(54) POSITIONING DEVICE (75) Inventors: Keitaro Yonezawa, Kobe (JP); Tsutomu Shirakawa, Kobe (JP)

(73) Assignee: Kosmek Ltd. (JP)

( * ) Notice: Subject to any disclaimer, the term of this patent is extended or adjusted under 35 U.S.C. 154(b) by 0 days.

(21) Appl. No.: 10/537,355

(22) PCT Filed: Dec. 10, 2003

(86) PCT No.: PCT/JP03/15760
§ 371 (c)(1),
(2), (4) Date: Jun. 6, 2005

(87) PCT Pub. No.: WO2004/060606

PCT Pub. Date: Jul. 22, 2004

(65) Prior Publication Data
US 2006/0186591 A1 Aug. 24, 2006

(30) Foreign Application Priority Data
Dec. 27, 2002 (JP) ............................. 2002-378881

(51) Int. Cl.
*B23Q 3/00* (2006.01)
(52) U.S. Cl. ..................................... 269/309
(58) Field of Classification Search ................. 269/20, 269/24, 27, 32, 25, 98.1, 93–94, 50, 52, 91, 269/157, 309, 310
See application file for complete search history.

(56) References Cited

U.S. PATENT DOCUMENTS 6,139,002 A 10/2000 Stark

FOREIGN PATENT DOCUMENTS

| EP | 1 078 713 A1 | 2/2001 |
| JP | 48-61481 U | 8/1973 |
| JP | 11010468 | 1/1999 |
| JP | 2002254266 | 9/2002 |

*Primary Examiner*—Robert C. Watson
(74) *Attorney, Agent, or Firm*—Bacon & Thomas PLLC (57) ABSTRACT A clamp pallet (2) as a reference member is fixed to a table (1) of a machining center. A tapered positioning hole (12) is opened in a lower surface of a work pallet (3) as a movable member. An annular central pillar (21) is projected upward from the clamp pallet (2), and an intermediate member (22) is arranged between the central pillar (21) and the positioning hole (12). The intermediate member (22) is composed of a shuttle member (23), which is diametrically expandable and contractible and supported on the central pillar (21) vertically movably, and a tapered cylinder (26), which is attached to an outer periphery of the shuttle member (23) and makes a tapering engagement with the positioning hole (12). The shuttle member (23) is urged upward by means of an elastic member (24).

8 Claims, 5 Drawing Sheets

POSITIONING DEVICE

TECHNICAL FIELD

The present invention relates to an apparatus for positioning a movable member such as a work pallet on a reference member such as a table of a machining center accurately.

BACKGROUND OF THE INVENTION

This kind of positioning apparatus is described in Japanese Patent Public Disclosure No. 11-10468. The positioning apparatus in the prior art is composed as follows.

That is, a flange of a retracting nipple fixed to a movable member is fitted into a fitting straight hole opened in a support surface of a reference member, by which the axis of the straight hole is aligned with that of the retracting nipple, and then the movable member is positioned in the reference member by pulling the retracting nipple.

However, the prior art contains several problems. That is, in order to attach the movable member to the reference member smoothly, it is required to provide a diametrical fitting gap between the fitting straight hole and the flange. Consequently, the fitting gap reduces the positioning accuracy of the movable member against the reference member.

The present invention aims at smoothly attaching a movable member to a reference member and aligning these members accurately.

SUMMARY OF THE INVENTION

In order to accomplish the objectives mentioned above, the present invention provides a positioning apparatus as described below and shown in FIG. 1, FIG. 4 or FIG. 5 for example.

A reference member R is provided with a support surface S for supporting a movable member M and a central pillar 21 projected from the support surface S toward a leading end. A positioning hole 12 is opened in a surface T to be supported of the movable member M. A shuttle member 23, which is diametrically expandable and contractible, is arranged between the central pillar 21 and the positioning hole 12. The shuttle member 23 is supported on either the central pillar 21 or the positioning hole 12 axially movably, and the shuttle member 23 is adapted to make a tapering engagement indirectly with the other (12, 21) via a tapered cylinder 26, which narrows toward the leading end. The tapered cylinder 26 is attached to the shuttle member 23, and the shuttle member 23 is pushed in such a direction as to tighten the tapering engagement by means of an advancing means 24.

This invention provides the following operation and effect.

When positioning the movable member on the reference member, the central pillar makes a tapering engagement with the positioning hole indirectly via the shuttle member and the tapered cylinder. Then, the movable member automatically moves while aligning by a guide action of the tapered cylinder to make the axis of the positioning hole of the movable member coincide with that of the central pillar of the reference member precisely. Next, the shuttle member is diametrically contracted (or expanded) by the tapered cylinder, by which the shuttle member is brought into close contact with the central pillar (or the positioning hole), the shuttle member moves axially against the advancing means, and the surface to be supported of the movable member is received by the support surface of the reference member. Therefore, the movable member can be constrained by the central pillar via the shuttle member and the tapered cylinder and also by the support surface. Consequently, the movable member can be positioned in the reference member accurately and strongly.

As described above, since the movable member can be guided while aligning by the tapered cylinder and the shuttle member, the movable member can be smoothly attached to the reference member. Further, unlike the preceding example in the prior art, since the diametrical fitting gap between the members to be connected together can be omitted in the present invention, the movable member can be aligned to the reference member with high accuracy.

In addition, since the shuttle member, which is diametrically expandable and contractible, is adapted to make the tapering engagement indirectly with the positioning hole (or the central pillar) via the tapered cylinder, the following advantages are presented, as compared with a case where the shuttle member, which is expandable and contractible, is adapted to make the tapering engagement directly.

That is, the shuttle member can be covered with the tapered cylinder, by which foreign matter such as swarf can be prevented from being bitten into an expandable and contractible mechanism (such as a slit or a groove) and a straight surface of the shuttle member, thereby the positioning accuracy can be retained for a long time.

It is preferable that a material of the shuttle member differs from that of the tapered cylinder. For example, the tapered cylinder may be made of a material excellent in hardness, by which the tapered cylinder can be prevented from being damaged caused by a collision while the tapering engagement, therefore life of the positioning apparatus is increased. In addition, the shuttle member may be made of a material excellent in sliding properties, by which the shuttle member moves axially smoothly, therefore the positioning accuracy is improved.

The present invention also includes the following positioning apparatus.

Figure 1:
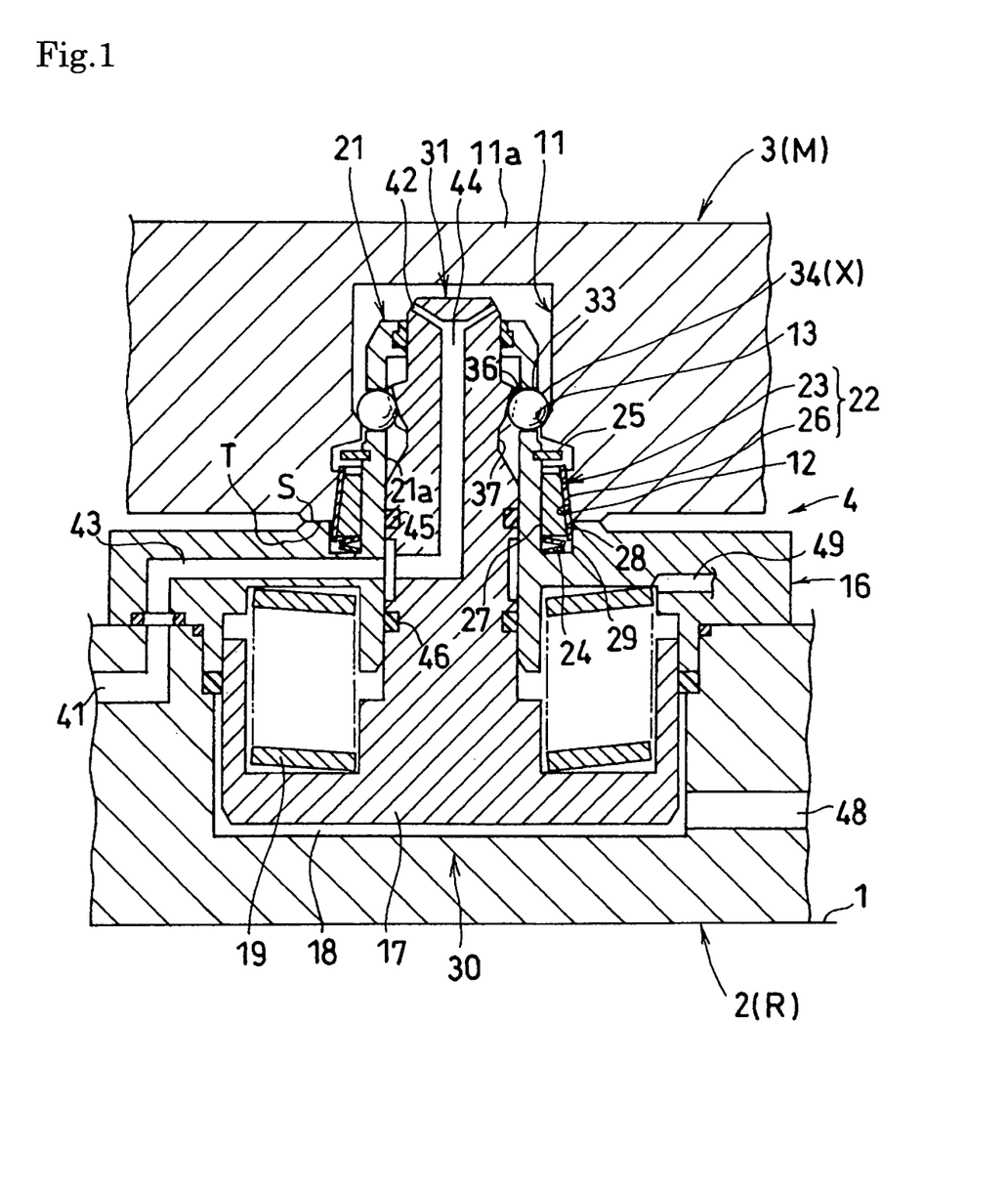
FIG. 1 is an elevational cross-sectional view showing a first embodiment according to the present invention, showing a state that a movable member is fixed to a reference member.
Figure 5:
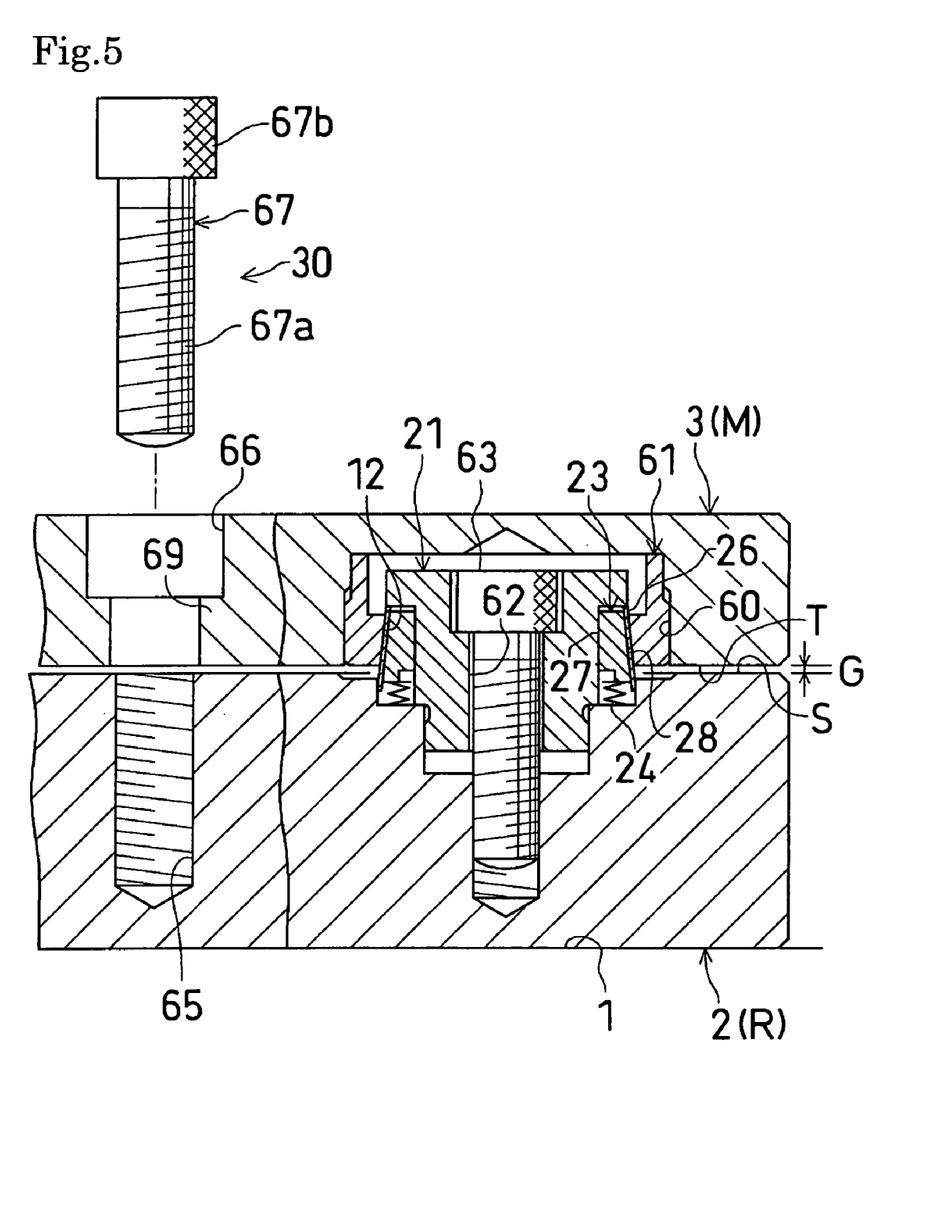
FIG. 5 is a view similar to FIG. 1, showing a third embodiment according to the present invention.

As shown in FIG. 1 or FIG. 5, for example, an inner peripheral surface of the shuttle member 23 is composed of a straight surface 27 and an outer peripheral surface of the shuttle member 23 is composed of a tapered surface 28, which narrows toward the leading end, the straight surface 27 is supported on the central pillar 21 axially movably, and the tapered surface 28 is adapted to make a tapering engagement with the positioning hole 12 via the tapered cylinder 26.

In this invention having the additional constitution, since the shuttle member and the tapered cylinder are attached to the reference member, the requisite number of the shuttle members and the tapered members can be reduced in a case that a number of movable members are to be attached and detached to one reference member.

Further, in the present invention, the following arrangement may be included.

Figure 4:
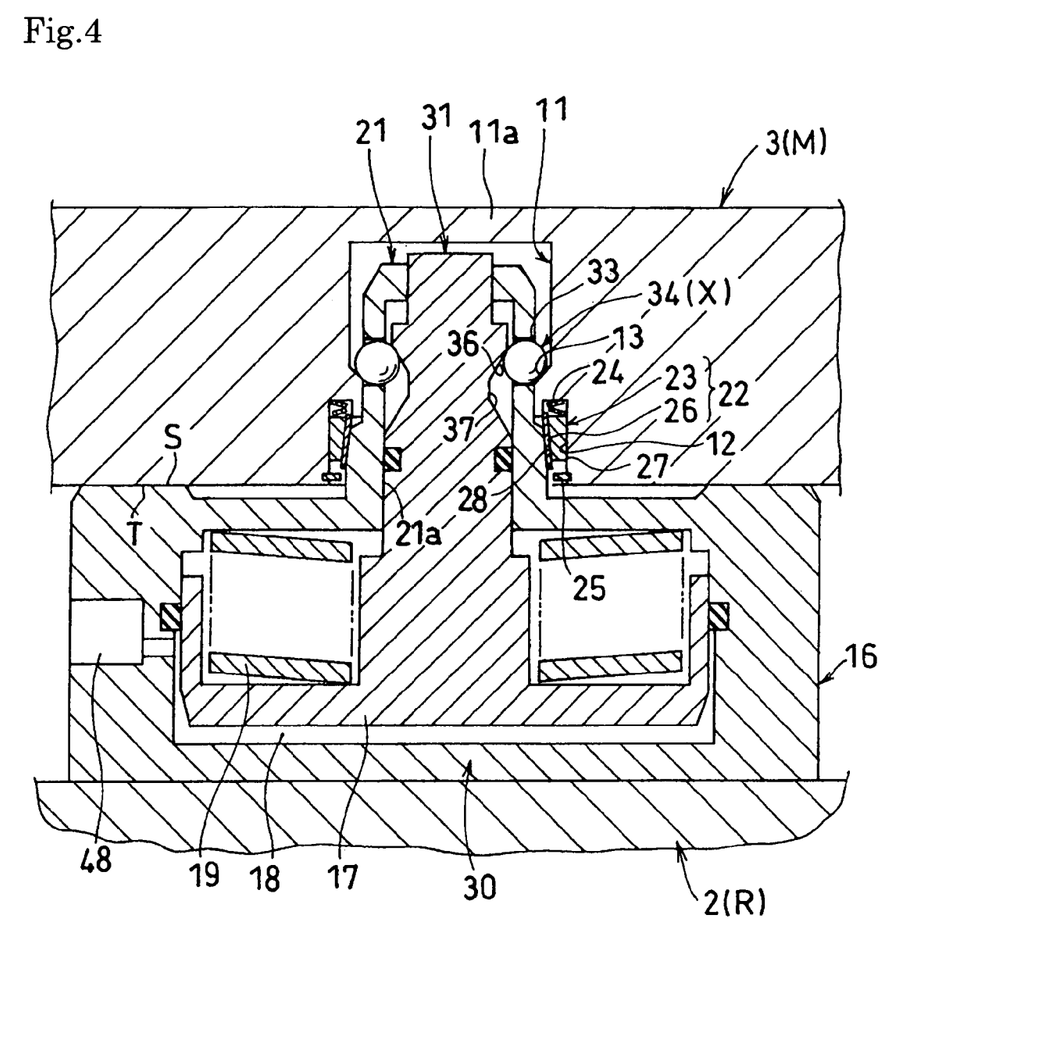
FIG. 4 is a view similar to FIG. 1, showing a second embodiment according to the present invention.

As shown in FIG. 4, for example, the outer peripheral surface of the shuttle member 23 is composed of the straight surface 27 and the inner peripheral surface of the shuttle 23 is composed of the tapered surface 28, which narrows toward the leading end, the straight surface 27 is supported on the positioning hole 12 axially movably, and the tapered surface 28 is adapted to make a tapering engagement with the central pillar 21 via the tapered cylinder 26.

In this invention having the additional constitution, since the shuttle member and the tapered cylinder can be attached inside the movable member, the shuttle member and the tapered cylinder can be prevented from being damaged caused by a collision with other objects.

In another invention for accomplishing the above-mentioned objectives, the positioning apparatus is composed as follows, as shown in FIG. 1 or FIG. 5 for example.

A reference member R is provided with a support surface S for supporting a movable member M and a central pillar 21 projected from the support surface S toward a leading end. A positioning hole 12 defined by a tapered hole is opened in a surface T to be supported of the movable member M. An intermediate member 22 is arranged between the central pillar 21 and the positioning hole 12. The intermediate member 22 is composed of a collet-type shuttle member 23 having on an outer periphery a tapered surface 28, which narrows toward the leading end, and a tapered cylinder 26, which is attached to the outer periphery of the shuttle member 23 and makes a tapering engagement with the positioning hole 12. The collet-type shuttle member 23 is supported on the central pillar 21 axially movably, and an inner peripheral surface of the tapered cylinder 26 makes a tapering engagement with the tapered surface 28 on the outer periphery of the shuttle member 23. An advancing means 24 is provided so as to push the shuttle member 23 in such a direction as to tighten the tapering engagement.

This invention substantially provides the same operation and effect as the above-described invention does. In addition, since the intermediate member is attached to the reference member, the requisite number of the intermediate member can be reduced in a case that a number of movable members are to be attached and detached to one reference member.

In another invention for accomplishing the above-mentioned objectives, the positioning apparatus is composed as follows, for example, as shown in FIG. 4.

A reference member R is provided with a support surface S for supporting a movable member M and a central pillar 21 projected from the support surface S toward a leading end. A positioning hole 12 defined by a straight hole is opened in the surface T to be supported of the movable member M. An intermediate member 22 is arranged between the central pillar 21 and the positioning hole 12. The intermediate member 22 is composed of a collet-type shuttle member 23 having on the inner periphery a tapered surface 28, which narrows toward the leading end, and a tapered cylinder 26, which is attached to the inner periphery of the shuttle member 23 and makes a tapering engagement with the central pillar 21. The collet-type shuttle member 23 is supported on the positioning hole 12 axially movably, and an outer peripheral surface of the tapered cylinder 26 makes a tapering engagement with the tapered surface 28 on the inner periphery of the shuttle member 23. An advancing means 24 is provided so as to push the shuttle member 23 in such a direction as to tighten the tapering engagement.

This invention substantially provides the same operation and effect as the foregoing invention does. In addition, since the intermediate member is attached inside the movable member, the intermediate member can be prevented from being damaged caused by a collision with other objects.

It is preferable that in the above-mentioned positioning apparatus the tapered cylinder 26 has a peripheral wall formed integrally in a circumferentially seamless manner, by which the tapered cylinder 26 can certainly prevent foreign matter such as swarf from being bitten into a straight surface and the tapered surface as well as an expandable and contractible mechanism (such as a slit or a groove, etc) of the shuttle member.

In addition, it is preferable that in the above-mentioned positioning apparatus at least either the leading end part or a base end part of the tapered cylinder 26 may be supported on the reference member R or the movable member M hermetically, which can further ensure prevention of foreign matter such as swarf from being bitten into the straight surface and the tapered surface of the shuttle member as well as the expandable and contractible mechanism (such as the slit or the groove, etc).

In addition, in the above-mentioned positioning apparatus, a clamp means 30, which presses the movable member M toward the reference member R, may be included.

BEST MODE FOR CARRYING OUT THE INVENTION

Figure 2A:
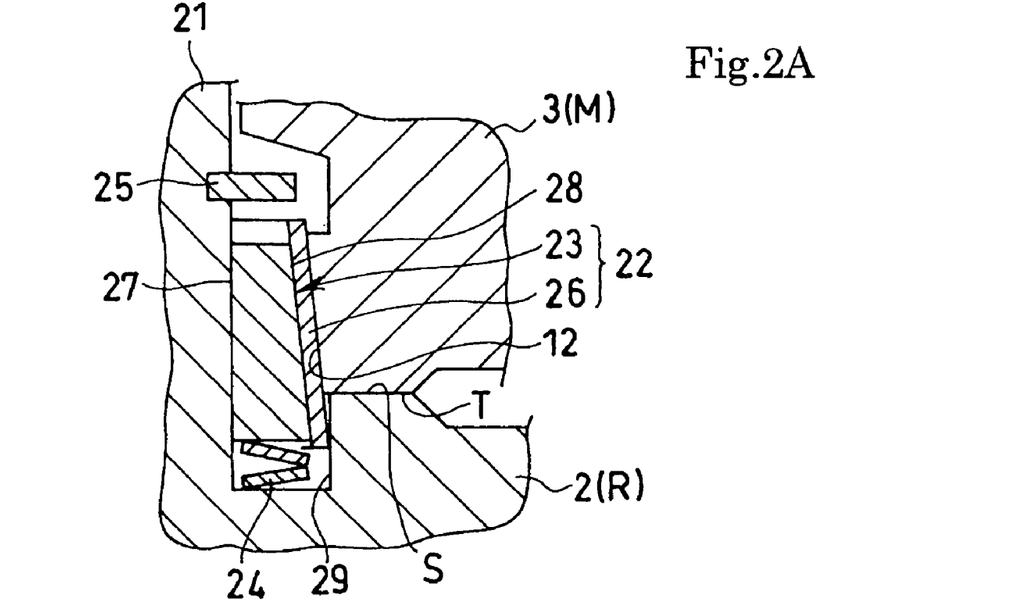
FIG. 2A is an enlarged view typically showing a substantial part in FIG. 1.
Figure 2B:
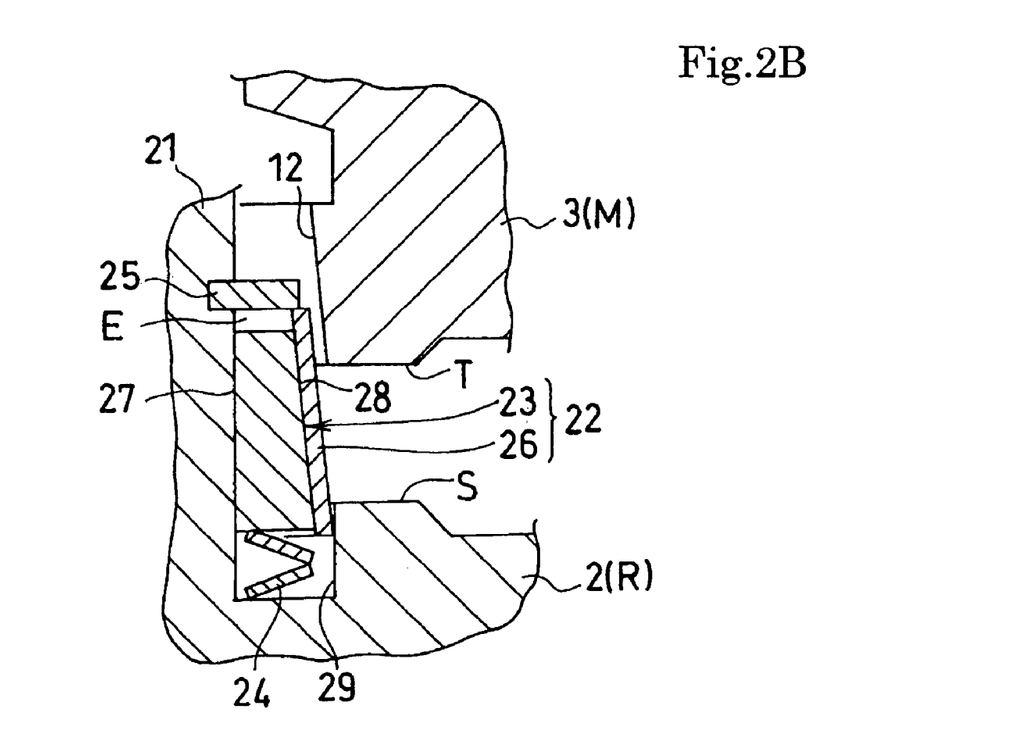
FIG. 2B is a view similar to FIG. 2A, showing a state that the movable member has been removed from the reference member.

FIG. 1, FIG. 2A and FIG. 2B show a first embodiment according to the present invention. FIG. 1 is an elevational cross-sectional view showing a state that a movable member is fixed to a reference member. FIG. 2A is an enlarged view typically showing a substantial part in FIG. 1. FIG. 2B is a view similar to FIG. 2A, showing a state that the movable member has been removed from the reference member.

On an upper surface of a table 1 of a machining center is fixed a clamp pallet 2 as the reference member R. On the clamp pallet 2 is fixed a work pallet 3 as the movable member M by means of a positioning apparatus 4 having a clamping function.

It is noted that, here, among a plurality of sets of positioning apparatuses 4 is shown only one set. Also, not shown in the figures, an upper surface of the work pallet 3 is formed in such a manner that a plurality of work pieces are attachable and detachable with work clamps thereon.

In a lower surface of the work pallet 3 is opened a socket hole 11, which is formed in a circular shape in a horizontal cross-sectional view. The socket hole 11 is provided with a tapered positioning hole 12 and a tapered engaging hole 13 in the recited order from the bottom. The positioning hole 12 is formed in such a manner as to narrow upward, while the tapered engaging hole 13 is formed in such a manner as to narrow downward. A lower part of an outer peripheral wall of the socket hole 11 is projected downward and a surface T to be supported is defined by a lower surface of the annular projecting part.

On the clamp pallet 2 is fixed a cover block 16 with a plurality of bolts (not shown). Between the cover block 16 and the clamp pallet 2 is hermetically inserted a piston 17, and at lower side of the piston 17 is formed a hydraulic chamber 18, and between the piston 17 and the cover block 16 is disposed a clamp spring 19. It is noted that the clamp spring 19 may be composed of a compressed coil spring instead of a plurality of coned disc springs laminated vertically.

An annular central pillar 21 is projected upward at the center part of the cover block 16, and the central pillar 21 is adapted to be inserted into the socket hole 11. At the outer periphery side of the central pillar 21 is projected upward an annular projecting part of the cover block 16, and a support surface S is defined by an upper surface of the annular projecting part.

Between a lower part of the central pillar 21 and the positioning hole 12 is arranged an intermediate member 22. The intermediate member 22 is composed of an annular shuttle member 23 and a tapered cylinder 26, which is attached to an outer periphery of the shuttle member 23 and makes a tapering engagement with the positioning hole 12.

Here, the tapered cylinder 26 is made of a material obtained by hardening special alloy steel such as bearing steel and die steel. In addition, the tapered cylinder 26 is composed of a peripheral wall formed integrally in a circumferentially seamless manner.

The above-described annular shuttle member 23 is composed of a collet, an inner peripheral surface thereof is composed of a straight surface 27, and an outer peripheral surface is composed of a tapered surface 28, which narrows upward. A slit is provided in the annular wall of the collet-type shuttle member 23 or a groove is provided in the inner peripheral surface (both not shown), by which the tapered surface 28 and the straight surface 27 are adapted to be diametrically expandable and contractible.

The straight surface 27 is supported on an outer peripheral surface of the central pillar 21 axially movably.

An inner peripheral surface of the tapered cylinder 26 makes a tapering engagement with the tapered surface 28. An elastic member (an advancing means) 24, which urges the shuttle member 23 in such a direction as to tighten the tapering engagement, is attached to the lower side of the shuttle member 23. And the tapered cylinder 26 is inhibited from moving upward by a retaining ring 25. The elastic member 24 is composed of a plurality of coned disc springs, and inserted into an attachment groove 29 formed in the support surface S. Into the attachment groove 29 is fitted the lower part of the tapered cylinder 26 slidably.

A clamp means 30, which presses the work pallet 3 to the clamp pallet 2, is also provided.

That is, a rod 31 is inserted into a cylindrical hole 21a of the central pillar 21 axially movably, and a lower part of the rod 31 is fixed to the piston 17. In a mid-elevated part of the central pillar 21 are opened a plurality of through holes 33 circumferentially at predetermined intervals, and an engaging ball 34 is supported on each of the through holes 33 movably between an engaging position X (refer to FIG. 1) arranged radially outward and a disengaging position (not shown) arranged radially inward.

On an upper part of an outer peripheral surface of the rod 31 are formed a pressing surface 36 and a evacuating groove 37 in vertical continuity in correspondence with each of the balls 34.

A means for cleaning the engaging surfaces of the positioning apparatus 4 is also provided. That is, the clamp pallet 2 is provided with a supply port 41 for supplying compressed air (cleaning fluid), and a plurality of discharge ports 42 are provided obliquely upward on an upper end of the rod 31. The supply port 41 communicates with the discharge port 42 via a horizontal flow passage 43 inside the cover block 16 and a vertical flow passage 44 inside the rod 31. The vertical flow passage 44 is sealed by an upper O-ring 45 and a lower O-ring 46. The hydraulic chamber 18 communicates with a hydraulic supply and discharge passage 48, and an accommodating space accommodating the clamp spring 19 communicates with the open air via a breathing passage 49.

The above-described positioning apparatus 4 operates as follows.

In a fixed state shown in FIG. 1, pressurized oil in the hydraulic chamber 18 has been discharged through the supply and discharge passage 48. Therefore, the clamp spring 19 strongly lowers the rod 31 via the piston 17, each pressing surface 36 of the rod 31 presses each of the engaging balls 34 toward the engaging position X arranged radially outward, the radially pressing force is converted to a downward force via the engaging hole 13, and the downward force strongly lowers the work pallet 3.

Therefore, as shown in FIG. 2A, the positioning hole 12 makes a strong tapering engagement with the tapered surface 28 of the shuttle member 23 via the tapered cylinder 26, the shuttle member 23 is diametrically contracted and brought into close contact with the central pillar 21, the shuttle member 23 descends against the elastic member 24, and the surface T to be supported is received by the support surface S. Thus, the work pallet 3 is constrained horizontally by the central pillar 21 via the shuttle member 23 and the tapered cylinder 26 and vertically by the support surface S. Consequently, the work pallet 3 can be strongly and accurately positioned and fixed to the clamp pallet 2.

It is noted that, the above-mentioned tapering engagement of the tapered cylinder 26 with the tapered surface 28 of the shuttle member 23 makes the tapered cylinder 26 descend against the shuttle member 23, by which the shuttle member 23 is diametrically contracted.

When releasing the above-described fixed state, it is required only to supply the pressurized oil to the hydraulic chamber 18 in a state shown in FIG. 1. Then, the piston 17 makes the rod 31 ascend by means of hydraulic pressure of the hydraulic chamber 18, by which each of the balls 34 is allowed to switch to the disengaging position (not shown) to face the evacuating groove 37, bringing the rod 31 into contact with a top wall 11a of the socket hole 11 to push the work pallet 3 upward. This allows the work pallet 3 to be easily removed from the clamp pallet 2 as shown in FIG. 2B.

In FIG. 2B, the shuttle member 23 makes an engagement with the tapered cylinder 26 in such a state that the shuttle member 23 is slightly diametrically expanded, and an upper end of the tapered cylinder 26 is brought into contact with the retaining ring 25 by means of the elastic member 24, and a contact gap E is formed between the retaining ring 25 and the shuttle member 23.

The shuttle member 23 can be covered by the tapered cylinder 26, by which foreign matter such as swarf can be prevented from being bitten into the straight surface 27 and the tapered surface 28 as well as the expandable and contractible mechanism (such as the above-mentioned slit and groove) of the shuttle member 23, thereby the positioning accuracy can be retained for a long time.

Figure 3A:
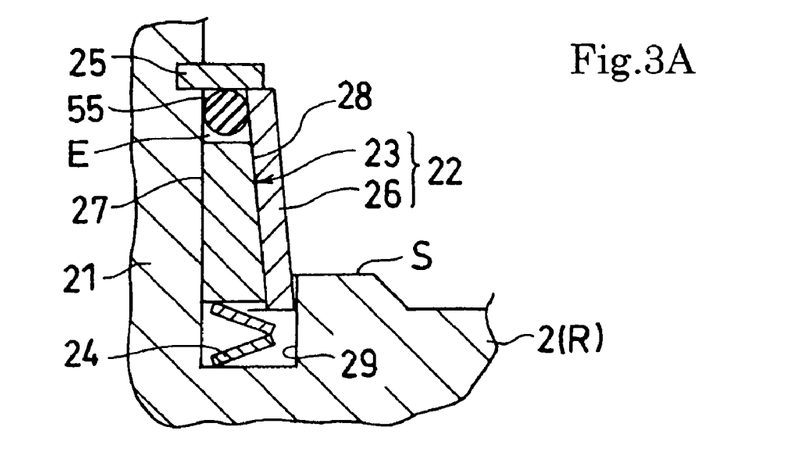
FIG. 3A is a view similar to FIG. 2B, showing a first exemplary variation of an intermediate member provided on the reference member.
Figure 3B:
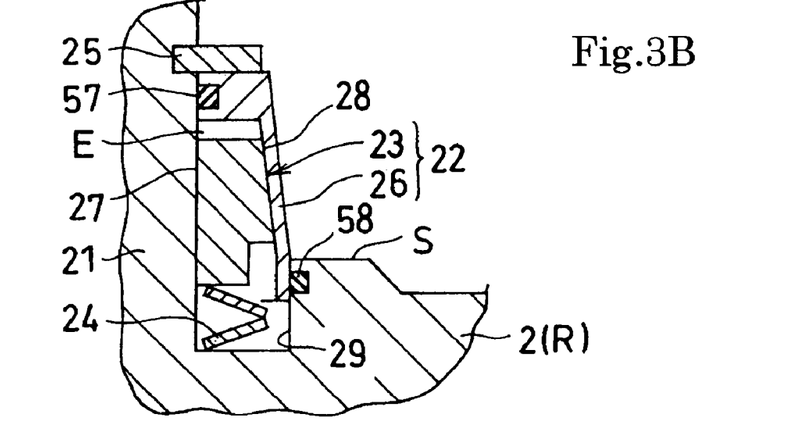
FIG. 3B is a view similar to FIG. 3A, showing a second exemplary variation of the intermediate member.
Figure 3C:
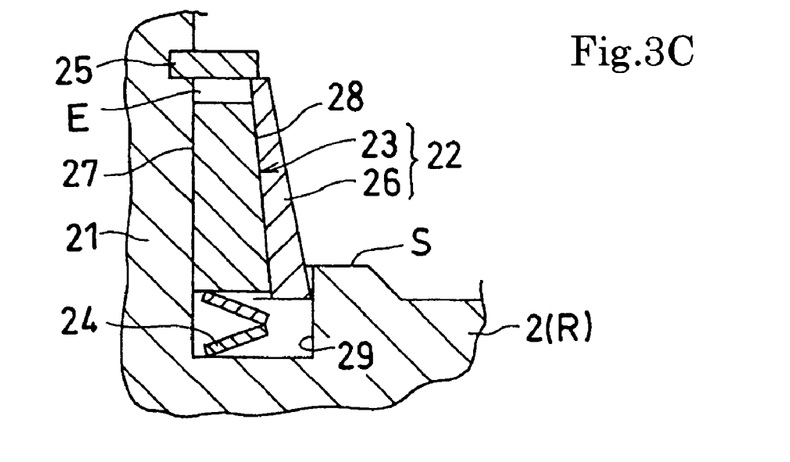
FIG. 3C is a view similar to FIG. 3A, showing a third exemplary variation of the intermediate member.

FIG. 3A through FIG. 3C are views similar to FIG. 2B, respectively showing a first through a third exemplary variation of the intermediate member 22. In these exemplary variations, the same components as those of the first embodiment will be designated by the same numerals as a general rule, and an explanation will be provided on only components different from those of the first embodiment.

In the first exemplary variation shown in FIG. 3A, between the upper end of the tapered cylinder 26 and the central pillar 21 is disposed an O-ring sealing member 55, which is received by the retaining ring 25. This can prevent foreign matter such as swarf from entering an inner space of the tapered cylinder 26.

It is noted that, in the first exemplary variation, an upper end of the shuttle member 23 may be brought into contact with the sealing member 55 with the contact gap E omitted.

In the second exemplary variation shown in FIG. 3B, a space between the upper end of the tapered cylinder 26 and the central pillar 21 is sealed by means of an upper O-ring 57 disposed on an upper part of the tapered cylinder 26, and a space between the lower end of the tapered cylinder 26 and the clamp pallet 2 is sealed by means of a lower O-ring 58 disposed on the attachment groove 29. This can certainly prevent foreign matter such as swarf from entering the inner space of the tapered cylinder 26.

In the third exemplary variation shown in FIG. 3C, a tapering angle of the inner periphery of the tapered cylinder 26 is designed differently from that of an outer periphery thereof.

FIG. 4 is a view similar to FIG. 1, showing a second embodiment according to the present invention. In the second embodiment, the same components as those of the first embodiment will be designated by the same numerals as a general rule, and an explanation will be provided on only components different from those of the first embodiment.

The positioning hole 12 of the socket hole 11 opened in the work pallet 3 is formed in a straight manner.

Between the positioning hole 12 and the central pillar 21 is arranged the intermediate member 22. The intermediate member 22 is composed of the collet-type shuttle member 23 having on the inner periphery the tapered surface 28, which narrows upward, and the tapered cylinder 26, which is attached to the inner periphery of the shuttle member 23 and makes a tapering engagement with the central pillar 21. The straight surface 27 on the outer periphery of the shuttle member 23 is supported on the positioning hole 12 axially movably. The outer peripheral surface of the tapered cylinder 26 makes a tapering engagement with the tapered surface 28 on the inner periphery of the shuttle member 23. Then, at upper side of the shuttle member 23 is disposed the elastic member 24, which urges the shuttle member 23 in such a direction as to tighten the tapering engagement.

In a clamped state shown in FIG. 4, the work pallet 3 is constrained horizontally by the central pillar 21 via the shuttle member 23, which is diametrically expanded and brought into close contact with the positioning hole 12, and the tapered cylinder 26 and vertically by the support surface S.

The clamp means 30 in the foregoing embodiments may be changed as follows.

The clamp means 30 shall not be restricted to the exemplified structure having the engaging balls 34, which engage with the tapered engaging hole 13. For example, the clamp means 30 may also be composed of a collet, which engages with a straight engaging hole by a frictional force or a plastic deformation force instead.

The clamp means 30 may be provided on the clamp pallet 2 away from the central pillar 21 instead of being incorporated in the central pillar 21. And the clamp means 30 may be driven by fluid pressure such as hydraulic pressure or air pressure instead of being driven by spring force.

FIG. 5 is a view similar to FIG. 1, showing a third embodiment according to the present invention. Also in the third embodiment, the same components as those of the first embodiment will be designated by the same numerals as a general rule, and an explanation will be provided on only components different from those of the first embodiment.

Into a circular hole 60 opened in the work pallet 3 is fitted a sleeve 61, on an inner peripheral surface of the sleeve 61 is formed the tapered positioning hole 12. And the central pillar 21 is fixed on the clamp pallet 2 with pressure by means of an installing bolt 63 inserted into a cylindrical hole 62 opened in the central pillar 21.

And the clamp means 30 is provided with a female screw 65 opened in the upper surface of the clamp pallet 2 and a tightening bolt 67 inserted into a stepped through hole 66 opened in the work pallet 3.

The clamp apparatus of the third embodiment operates as follows.

While the work pallet 3 descends by its own weight, at first, as shown in FIG. 5, the positioning hole 12 makes a tapering engagement with the tapered surface 28 of the shuttle member 23 via the tapered cylinder 26 to move while aligning, and the axis of the positioning hole 12 coincides with that of the central pillar 21 accurately. In this case, the shuttle member 23 is held at an upper position by means of the urging force of the elastic member (coned disc spring) 24, and between the surface T to be supported of the work pallet 3 and the support surface S of the clamp pallet 2 is formed a clamping gap G.

Then, a leg screw 67a of the fixing bolt 67 is screwed into the female screw 65, thereby pressing downward a shoulder portion 69 of the through hole 66 by means of the head portion 67b of the fixing bolt 67. Therefore, the work pallet 3 is pulled by the fixing bolt 67 toward the clamp pallet 2, the tapered cylinder 26 and the shuttle member 23 are lowered by the positioning hole 12 against the elastic member 24, and the surface T to be supported is brought into contact with the support surface S. As a result, the work pallet 3 is constrained horizontally by the central pillar 21 via the shuttle member 23 diametrically contracted by the positioning hole 12 and the tapered cylinder 26 and vertically by the support surface S.

The foregoing embodiments may be changed as follows.

It is preferable that the tapered cylinder 26 is composed of the peripheral wall formed integrally in a circumferentially seamless manner, however, the peripheral wall may be provided with cuts such as slits or grooves instead. In this case, it is preferable that the slits or the grooves are provided with elastic sealing members made of rubber, etc.

The shuttle member 23 shall not be restricted to be formed in the exemplified annular shape but may be composed of a plurality of divided members arranged annularly.

The advancing means 24 may be composed of an elastic member such as another type of spring (a compressed coil spring for example) or rubber, etc, instead of the exemplified coned disc springs.

Further, the advancing means 24 may take advantage of pressure force of a fluid power cylinder such as hydraulic pressure or air pressure. According to the fluid power cylinder-based advancing means, when releasing, the shuttle member 23 advances toward the leading end by means of a fluid power piston for advancing, and when clamping, the shuttle member 23 retreats against pressure force of the fluid power piston.

The central pillar 21 is required only to be fixed on the clamp pallet 2. Therefore, the central pillar 21 may be formed integrally with the cover block 16, or connected strongly onto the cover block 16 by means of bolts, etc.

In addition, the cover block 16 may be formed integrally with the clamp pallet 2 instead of being formed individually.

In a case that the movable member M such as the work pallet 3 is substantially great in weight, the movable member M can be positioned and fixed by its own weight to the reference member R. In this case, the above-described clamp means 30 may be omitted.

The reference member R may be a table of a machining center or various types of machinery instead of the exemplified clamp pallet 2. And the movable member M may be a work piece instead of the exemplified work pallet 3. The combination of reference member R and the movable member M may be arranged upside down, or may be connected in such a direction that the combination is arranged horizontally or obliquely instead of vertically as exemplified.

In addition, the usage of the present invention shall not be restricted. As a matter of course, the present invention can be used for positioning not only work pallets, work pieces, but also metal molds, attachments, etc. The number of the positioning apparatuses shall not be restricted. The present invention provides the foregoing operation and effect with at least one set, that is, it is not necessary to provide a plurality of sets.

What is claimed is:

1. A positioning apparatus, wherein
   a reference member (R) is provided with a support surface (S) for supporting a movable member (M) and a central pillar (21) projected from the support surface (S) toward a leading end,
   a positioning hole (12) is opened in a surface (T) to be supported of the movable member (M),
   a shuttle member (23), which is diametrically expandable and contractible, is arranged between the central pillar (21) and the positioning hole (12),
   the shuttle member (23) is supported on one of the central pillar (21) and the positioning hole (12) axially movably, and the shuttle member (23) is adapted to make a tapering engagement indirectly with the other of the central pillar (21) and the positioning hole (12) via a tapered cylinder (26), which narrows toward the leading end,
   the tapered cylinder (26) is attached to the shuttle member (23), the shuttle member (23) is adapted to be pushed in such a direction as to tighten the tapering engagement by means of an advancing means (24).

2. A positioning apparatus as set forth in claim 1, wherein an inner peripheral surface of the shuttle member (23) comprises a straight surface (27) and an outer peripheral surface of the shuttle member (23) comprises a tapered surface (28), which narrows toward the leading end, the straight surface (27) is supported on the central pillar (21) axially movably, and the tapered surface (28) is adapted to make a tapering engagement with the positioning hole (12) via the tapered cylinder (26).

3. A positioning apparatus as set forth in claim 1, wherein an outer peripheral surface of the shuttle member (23) comprises a straight surface (27) and an inner peripheral surface of the shuttle member (23) comprises a tapered surface (28), which narrows toward the leading end, the straight surface (27) is supported on the positioning hole (12) axially movably, and the tapered surface (28) is adapted to make a tapering engagement with the central pillar (21) via the tapered cylinder (26).

4. A positioning apparatus, wherein
   a reference member (R) is provided with a support surface (S) for supporting a movable member (M) and a central pillar (21) projected from the support surface (S) toward a leading end,
   a positioning hole (12) defined by a tapered hole is opened in a surface (T) to be supported of the movable member (M),
   an intermediate member (22) is arranged between the central pillar (21) and the positioning hole (12),
   the intermediate member (22) comprises a collet-type shuttle member (23) having on an outer periphery a tapered surface (28), which narrows toward the leading end, and a tapered cylinder (26), which is attached to the outer periphery of the shuttle member (23) and makes a tapering engagement with the positioning hole (12),
   the collet-type shuttle member (23) is supported on the central pillar (21) axially movably, and the inner peripheral surface of the tapered cylinder (26) makes a tapering engagement with the tapered surface (28) on the outer periphery of the shuttle member (23), and an advancing means (24) is provided so as to push the shuttle member (23) in such a direction as to tighten the tapering engagement.

5. A positioning apparatus, wherein
   a reference member (R) is provided with a support surface (S) for supporting a movable member (M) and a central pillar (21) projected from the support surface (S) toward a leading end,
   a positioning hole (12) defined by a straight hole is opened in a surface (T) to be supported of the movable member (M),
   an intermediate member (22) is arranged between the central pillar (21) and the positioning hole (12),
   the intermediate member (22) comprises a collet-type shuttle member (23) having on an inner periphery a tapered surface (28), which narrows toward the leading end, and a tapered cylinder (26), which is attached to the inner periphery of the shuttle member (23) and makes a tapering engagement with the central pillar (21),
   the collet-type shuttle member (23) is supported in the positioning hole (12) axially movably, and an outer peripheral surface of the tapered cylinder (26) makes a tapering engagement with the tapered surface (28) on the inner periphery of the shuttle member (23), and an advancing means (24) is provided so as to push the shuttle member (23) in such a direction as to tighten the tapering engagement.

6. A positioning apparatus as set forth in claim 1, wherein the tapered cylinder (26) has a peripheral wall formed integrally in a circumferentially seamless manner.

7. A positioning apparatus as set forth in claim 1, wherein at least either the leading end part or a base end part of the tapered cylinder (26) is supported on the reference member (R) or the movable member (M) hermetically.

8. A positioning apparatus as set forth in claim 1, wherein a clamp means (30), which presses the movable member (M) toward the reference member (R), is provided.

* * * * *